US011250632B2

(12) United States Patent
Sokal et al.

(10) Patent No.: US 11,250,632 B2
(45) Date of Patent: Feb. 15, 2022

(54) HIGH QUALITY AR COSMETICS SIMULATION VIA IMAGE FILTERING TECHNIQUES

(71) Applicant: Google LLC, Mountain View, CA (US)

(72) Inventors: Kanstantsin Sokal, Mountain View, CA (US); Siarhei Kazakou, Mountain View, CA (US); Igor Kibalchich, Mountain View, CA (US); Matsvei Zhdanovich, Mountain View, CA (US)

(73) Assignee: Google LLC, Mountain View, CA (US)

( * ) Notice: Subject to any disclaimer, the term of this patent is extended or adjusted under 35 U.S.C. 154(b) by 153 days.

(21) Appl. No.: 16/692,267

(22) Filed: Nov. 22, 2019

(65) Prior Publication Data

US 2021/0158619 A1 May 27, 2021

(51) Int. Cl.
*G06T 19/00* (2011.01)
*G06T 7/73* (2017.01)
*G06T 15/50* (2011.01)
*G06T 7/11* (2017.01)
*G06T 5/00* (2006.01)
*G06T 7/246* (2017.01)
*G06K 9/00* (2006.01)
*G06T 3/00* (2006.01)

(52) U.S. Cl.
CPC ........ *G06T 19/006* (2013.01); *G06K 9/00228* (2013.01); *G06T 3/0093* (2013.01); *G06T 5/00* (2013.01); *G06T 7/11* (2017.01); *G06T 7/246* (2017.01); *G06T 7/73* (2017.01); *G06T 15/503* (2013.01); *G06T 2207/20081* (2013.01); *G06T 2207/30201* (2013.01)

(58) Field of Classification Search
CPC ........ G06T 19/006; G06T 7/11; G06T 7/246; G06T 7/73; G06T 3/0093; G06T 5/00; G06T 15/503; G06T 2207/20081; G06T 2207/30201; G06K 9/00228
See application file for complete search history.

(56) References Cited

U.S. PATENT DOCUMENTS 6,437,866 B1 * 8/2002 Flynn .................... G06T 11/001
356/402
2011/0234581 A1 * 9/2011 Eikelis ............... G06K 9/00228
345/419

(Continued)

OTHER PUBLICATIONS

Cox, How to Split-Tone Photos in Lightroom, Feb. 2018 (Year: 2018).*

(Continued)

*Primary Examiner* — Phuc N Doan
(74) *Attorney, Agent, or Firm* — Dority & Manning.P.A.

(57) ABSTRACT

The disclosure is directed to embodiments for producing high-quality images simulating the application of a material (e.g., virtual cosmetics) to a person's body. Example implementations can generate an augmented image displaying a virtual cosmetic layer (e.g., lipstick) on a person's face. For instance, a computing system can obtain an image depicting the face and identify a region for applying the cosmetic. The system can use augmented reality and/or image filtering to process the image into datasets that can be combined with material data related to the virtual cosmetic to generate augmented image(s) simulating application of the material.

19 Claims, 6 Drawing Sheets
(4 of 6 Drawing Sheet(s) Filed in Color)

(56) References Cited

U.S. PATENT DOCUMENTS

| | | | | |
|---|---|---|---|---|
| 2014/0267665 A1* | 9/2014 | Howell | .................. | G01J 3/50 |
| | | | | 348/77 |
| 2016/0065861 A1* | 3/2016 | Steinberg | ......... | H04N 5/232933 |
| | | | | 348/239 |
| 2016/0196665 A1* | 7/2016 | Abreu | .................. | G06T 7/251 |
| | | | | 345/427 |
| 2016/0316886 A1* | 11/2016 | Samain | .................. | A45D 33/00 |
| 2017/0076474 A1* | 3/2017 | Fu | .................. | G06K 9/00268 |
| 2017/0169285 A1* | 6/2017 | Chen | .................. | G06K 9/00268 |
| 2018/0271259 A1* | 9/2018 | Comeaux | ............... | D21H 21/28 |

OTHER PUBLICATIONS

Wiwatwattana, Enhancing Lipstick Try-On with Augmented Reality and Color Prediction Model, 2018, pp. 359-367 (Year: 2018).*

Campos et al., "Virtual Makeup: Foundation, Eye Shadow and Lipstick Simulation", Symposium on Virtual and Augmented Reality, 2014, 9 pages.

Evangelista et al., "Realistic AR Makeup over Diverse Skin Tones on Mobile", International Association for Computing Machinery's Special Interest Group on Computer Graphics and Interactive Techniques, Dec. 4-7, 2018, Tokyo, Japan, 2 pages.

Gonzalez et al., "Digital Image Processing ($3^{rd}$ Edition)", Pearson Prentice Hall, Inc., Upper Saddle River, New Jersey, 976 pages.

Kim et al., "Interactive Cosmetic Makeup of a 3D Point-Based Face Model", IEICE Transactions on Information and Systems, vol. E91-D, No. 6, 2008, pp. 1673-1680.

Li et al., "Simulating Makeup through Physics-Based Manipulation of Intrinsic Image Layers", IEEE Conference on Computer Vision and Pattern Recognition, 2015, pp. 4621-4629.

Pegelow, "Shadow Recovery Revisited", Feb. 17, 2012, https://www.darktable.org/2012/02/shadow-recovery-revisited/, retrieved on Feb. 19, 2020, 8 pages.

Porter, "Compositing Digital Images", Computer Graphics, vol. 18, No. 3, 1984, pp. 253-259.

* cited by examiner

HIGH QUALITY AR COSMETICS SIMULATION VIA IMAGE FILTERING TECHNIQUES

FIELD

The present disclosure relates generally to image processing. More particularly, the present disclosure relates to computer-implemented systems and methods which can generate augmented images displaying application of a material to facial features such as the lips. Aspects of the present disclosure can further include providing the augmented images for display in real-time on various computing devices.

BACKGROUND

Augmented reality can refer to a live view of a physical, real-world environment that has been "augmented" with computer-added perceptual information which can be referred to as virtual objects or layers. For example, the computer-added virtual objects can include information designed to be experienced through one or more sensory modalities such as, for example, the visual, auditory, haptic, somatosensory, and/or olfactory senses.

Some augmented reality systems can present virtual objects that have been created using complex scanning systems; however, these scanning systems can be expensive and are not widely available. Other augmented reality application can provide cartoons or other simplified drawings to an image based on applying a filter. However, there still exists a need for providing virtual objects or layers that are of high quality and that can be implemented on a variety of devices.

SUMMARY

Generally, the present disclosure is directed to systems and methods for producing high-quality images simulating the application of a material (e.g., virtual cosmetics) to a person's body. Example implementations can generate an augmented image displaying a virtual cosmetic layer (e.g., lipstick) on a person's face. For instance, a computing system can obtain an image depicting the face and identify a region for applying the cosmetic. The system can use augmented reality and/or image filtering to process the image into datasets that can be combined with material data related to the virtual cosmetic to generate augmented image(s) simulating application of the material. Using this framework provides a durable process that can also be implemented in real-time using a variety of systems. Thus, in one example, the proposed systems and methods can enable engaging AR experiences such as allowing a user to virtually "try-on" AR lipstick or other virtual cosmetics materials.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Example drawings are attached. A brief description of the drawings is provided below, and detailed discussion of embodiments directed to one of ordinary skill in the art is set forth in the specification, which makes reference to the appended figures, in which:

FIG. 6A depicts augmented images having different material properties (materials 1-4) alongside an original image (no material). FIG. 6B depicts augmented images (AR) produced using material properties corresponding to real lipstick. Images displaying the real lipstick are shown above augmented images at two lighting conditions (light 1 and 2).

DETAILED DESCRIPTION

Overview

Figure 1:
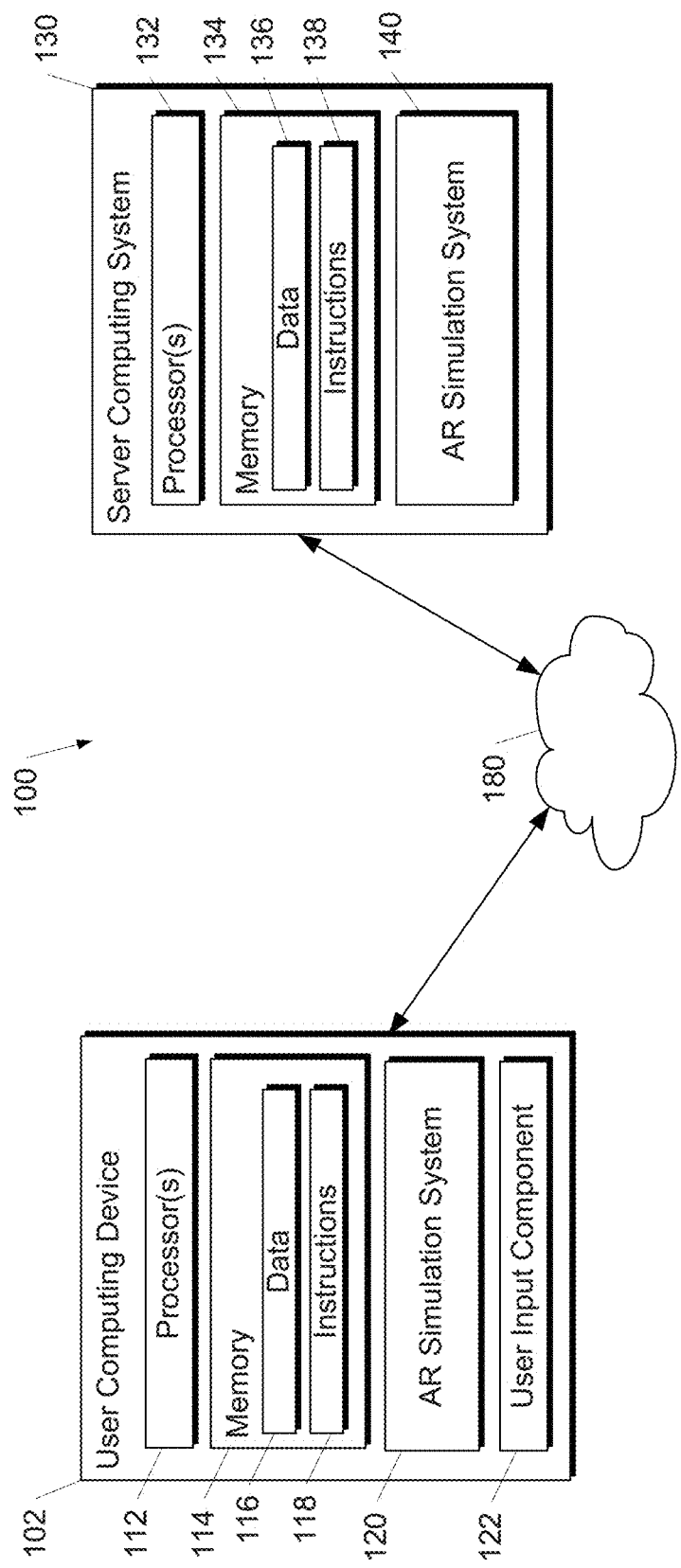
FIG. 1 depicts an example computing system according to example implementations of the present disclosure.

Generally, the present disclosure provides systems and methods for producing high-quality augmented reality (AR) images that simulate the application of a material (e.g., virtual cosmetics such as lipstick, eyeshadow, blush, foundation, eye liner, and/or the like) to a person's face. In particular, a computing system can obtain an image that depicts face. The computing system can perform face tracking and/or image filtering or segmentation techniques to identify a region of the face to which the virtual cosmetics should be applied. The computing system can also process the image to account for variations in lighting, skin color, or other attributes of the input image. The processed images can then be combined with or otherwise modified based on material property data (e.g., material base color, reflectivity, opacity, etc.) to generate an augmented image that simulates application of the material to the facial feature. The augmented image can be displayed (e.g., to the user depicted in the image in real-time). Thus, in one example, the proposed systems and methods can enable engaging AR experiences such as allowing a user to virtually "try-on" AR lipstick or other virtual cosmetics materials. Furthermore, the proposed processing techniques are designed to be both lightweight and highly interpretable, enabling understanding from many different parties while also running with low latency on relatively low power devices such as mass-market smartphones.

More particularly, according to an aspect of the present disclosure, a method for producing an augmented image can include decomposing an input image into multiple image datasets by dividing the light spectrum of the image into multiple ranges. The method can also include obtaining material property data (e.g., color, reflectivity, opacity, etc.) associated with the virtual cosmetics and merging each different image dataset with some or all of the material property data. Further, the method can include blending the merged datasets with the original image. Using this framework provides a durable process that can also be implemented in real-time using a variety of systems.

As an example for illustration, a user interested in a specific shade of lipstick may be hesitant to purchase from an online retailer or other entity without knowledge of how the shade matches her skin tone. To help the user, the online retailer may implement a system according to the present disclosure. If the user chooses to participate, the example system can provide the user an augmented image based on receiving an image obtained from a webcam, front facing camera, or other camera device. Using this information, the online retailer may provide a real-time simulation (e.g., using video from the camera). Additionally or alternatively, the online retailer can generate an augmented image using a photograph supplied by the user.

By detecting the lips or other facial features (e.g., nose, cheeks, eye lashes, eye lids, chin, etc.) on the video or photographic imagery, a mapping of the feature surface can be generated and decomposed into multiple light spectrum ranges. The filtered images can be combined with material data associated with the shade of lipstick or other material properties such as gloss, opacity, etc. to generate a virtual layer that combined with the input image(s) produces the augmented image displaying the person's face with lipstick.

Aspects of dividing the light spectrum into multiple ranges can include segmenting the image into shadows, mid-tones, and highlights. In general, shadows are darker areas of an image, highlights are lighter areas of an image, and mid-tones are regions having values in between shadows and highlights. As an example, consider a grayscale image: the darker features such as black would be considered shadows, the lighter features such as white would be considered highlights and intermediate features such as grays would be considered mid-tones. Thus, a dataset storing the shadows may only include certain areas or regions of the original image. In some instances, dividing the light spectrum into multiple ranges can be based on both global and local features such as relative difference in brightness in an area, compared to the overall image brightness. In this manner, an image may be divided into regions and for each region the light spectrum may be divided into multiple ranges. As one example, for each pixel or for a subset of the pixels in an image, a neighborhood of local features such as a brightness intensity distribution can be determined can rather than using the brightness intensity distribution across the whole image.

To divide an input image into each of these ranges, image processing software may be included on an example device or accessed using an application or via a web service. Thus, identifying the shadows, highlights, or mid-tones may utilize a standard technique in some implementations. Alternatively, the shadows, highlights and mid-tones may be determined based on the population of pixels in the input image by creating a brightness metric for each pixel. The brightness over the entire image can then be used to determine percentiles that each define one range of the light spectrum. As an example, the highlights may include the upper 10 percent brightness, the shadows may include the lower 10 percent brightness, and the mid-tones may include the remainder. Alternatively, the mid-tones can include a sub-population of the remainder such as the middle 40-60 percent brightness.

One example aspect of the present disclosure is that computations, such as those associated with image processing, can be performed in the linear RGB color space. Though not limited to the RGB color space, many common computing devices display images using the RGB color space. Thus, implementations of the disclosure may be included with or otherwise accessed by various computing devices. Additionally, image processing in the RGB color space including desaturating images, adjusting contrast, and other operations are generally included as instructions that can be accessed by the device or by an application included on the device. Thus for some implementations, an aspect of decomposing the image into one or more light spectrum ranges can include accessing one or more image processing applications that are present on or may be accessed by the computing device.

In addition to image processing, face detection and land-marking technology (e.g., including technology implemented by mobile smartphones) can be used to identify high-fidelity facial semantic regions for an area of the face. The semantic regions and associated imagery can be used to generate AR material maps by warping canonical static material maps on top of the facial feature (e.g., lips) 3D surfaces detected on the input frame. For example, an AR engine (e.g., ARKit or ARCore) can be configured to estimate coordinate locations which define a facial feature such as the lip surface upon receiving an image from a camera. The estimated coordinates can be combined with the decomposed images to create 3D maps of the facial features. AR material maps can be generated by applying material property data associated with the spectral bands to the decomposed images for each respective spectral band. The AR material maps may be used during the final blending operations for masking those areas, which can be augmented by various AR material simulation pipeline stages.

Additional parameters may also be defined for certain blending operations, which can provide a way to tune some implementations for a specific AR material without a need to modify underlying processes such as generating the AR material map by blending material data. For instance, aspects other than color of the AR cosmetics can also be defined such as opacity, reflectivity, and gloss. Additionally, each of these material properties can include or may be associated with light spectrum data that can be used to define a weighting for the blending operation (e.g., by averaging, emphasizing, or reducing) based on an association with one or more of the divided light spectrum ranges. For example, blending certain material properties such as gloss, may be configured to emphasize highlights (e.g., by reducing the opacity of the highlights material map). Thus, blending operations can be weighted based in part on the material properties or a spectral band associated with a material property. In general, material properties can be pre-defined, user specified, obtained from relevant data sources (e.g., personal search history or general search trends), or any combination thereof.

In an example implementation, a method for simulating application of a material (e.g., cosmetics) to a region of the face can include obtaining or otherwise receiving by an example system an image of the face. The system can include or otherwise access an engine for detecting faces and/or an augmented reality engine for mapping regions of a face such as the lips in the received image. The system can also include or otherwise access image processing applications that can decompose an image into multiple image datasets, each associated with a different range of the light spectrum, that can be stored or further processed upon decomposition. For example, one image dataset may include characteristics such as shadows, another image dataset can include highlights, and another mid-tones. Additionally, each of these datasets may include information about the location of the facial feature such that combining the dataset with material properties for the virtual cosmetics can produce one or more AR material maps associated with each light spectrum range. An augmented image can be generated by blending the AR material maps with the original image.

An example aspect of certain implementations includes applying one or more blending operations to combine attributes of image datasets or AR material maps. For instance, generally, an alpha blend with the original input frame/image is performed during the generation of the augmented image. Additional blending operations can be performed in a certain order or may be combined into a single operation. For example, the mid-tones map may be blended with one or more image datasets associated with a light spectrum range. In an example process for generating the augmented image, the mid-tones map can be blended with the image datasets associated with the shadows and mid-tones ranges to generate a screen blend. Then the screen blend can be blended with the image dataset associated with the highlights range and the highlights map to generate an add blend. The add blend can be blended with the original image, or the original image and a shadows map, to produce the augmented image. Further, these blending operations can include additional input(s) to incorporate material property data such as mid-tones opacity, highlights opacity, or lipstick opacity.

Additionally, each blending step can be independently weighted to define how attributes from a first blending dataset such as a pixel value should be combined with a corresponding attribute from a second blending dataset. As an example, blending the screen blend with the highlights map and the image dataset for the highlights range can include a weighting applied to each blended dataset (e.g., w1: screen blend, w2: highlights map, and w3: highlights dataset). In general, each of the weightings (e.g., w1, w2, and w3) can be independently selected and may be applied to some or all of the datapoints included in each blended dataset.

An example aspect of implementations according to the present disclosure includes decomposing the image into a plurality of image datasets corresponding to the spectral bands. Operations for performing spectral decomposition can include receiving or otherwise obtaining (e.g., using an image processing application) an input black and an input white based on attributes of the original image. A gamma value can also be similarly obtained. In an example implementation, these attributes of the original image can be adjusted, across some or all of the original image to decompose the image into one or more spectral bands. For instance, the input black and input white value range can be moved to a different continuous range such as a [0,1] range. After modifying the input black and input white values to a different continuous range, certain implementations may also include a further transform to adjust the continuous range to an output black and an output white which define different values from the input black and the input white. Additionally or alternatively, the gamma value(s) for some or a portion of the original image may be adjusted. Since gamma values can be used to define luminescence (e.g., pixel brightness) adjusting gamma may be used in some implementations as one of the operations for decomposing the image into shadows and highlights.

Additionally, in some implementations a normalization process can be applied to the original image frame prior to or as part of decomposition of the image. Aspects of normalization can include reducing the saturation of the original image frame to produce a desaturated image. While processes and transformations can be better understood with reference to available techniques, it should be understood that these techniques provide guidelines and implementations of the disclosure are not limited to such guidelines. Equivalent operations or the inclusion of additional image processing steps may be incorporated in implementations according to the present disclosure.

In certain implementations, systems and methods according to the present disclosure may include instructions for providing, for display on a device, the augmented image. For some implementations, the augmented image may include a single frame including no additional information about the 3D surface of the lips. Alternatively, for certain implementations (e.g., when receiving the augmented image on a device that has includes an AR engine) the augmented image can include a plurality of frames that together can be used to generate a composite three-dimensional image (e.g., using 3D feature extraction and/or image stitching techniques).

For some implementations, systems and methods according to the present disclosure may also include instructions for providing, for display on a device, a user interface. The user interface can include an area displaying the image of the face, an area for selecting material properties, and an area displaying a location/region on the face. Example aspects of the area displaying the image of the face can include a connection to other applications on a user device such as a camera so that the area can provide real-time display of the user or can access photographs stored in a local or remote library. Example aspects of the area for selecting material properties can include various attributes such as a color pallet for selecting the material color (e.g., red), an opacity for selecting the transparency of the virtual layer, and/or other similar visual attributes. Example aspects of the area displaying a location/region on the face can include a boundary line, shape, or other form indicating the location/region. Receiving a user interaction with the user interface can be used to adjust the augmented image by modifying user interface elements (e.g., dropdown menus, text boxes, selection boxes, sliders, etc.) to change an attribute.

Example advantages of implementations according to the present disclosure can include the ability to execute methods across a wide variety of devices and platforms without the need for specialized engines or processing power. For instance, example implementations can generally access and utilize image processing applications that are widely available without the need for specialized software or hardware capabilities. Certain implementations can be executed as part of a web application such as an online advertisement. Some implementations can be included on a personal computing device such as a smartphone and executed by accessing built-in image processing applications and/or facial detection engines. As another technical benefit, many of the image processing techniques described herein map well to the GPU programming model, which enables real-time performance on many common devices.

Various technical effects may also be realized from implementations according to the present disclosure. In combining image processing techniques with augmented reality data, high-quality visual imagery can be generated for applying a virtual layer to photos or video. Additionally, due to the growing prevalence of computing devices in everyday life, virtual content such as augmented images may become a daily routine just like physical cosmetics. Using implementations according to the present disclosure, a database of virtual avatars comprising one or more augmented images may be created. This database can be accessed by augmented reality applications such that viewing a person's face with a device in communication with the database can instead provide the virtual avatar associated with the person's face. Further, virtual simulations need not be limited to cosmetics. Facial or other biometric recognition techniques may be used to index the database to generate a virtual avatar having various virtual layers such as virtual clothes, virtual jewelry, or other virtual imagery. The virtual imagery can be associated with a region of the body and transmitted substantially in real-time for display on the device.

With reference now to the Figures, example embodiments of the present disclosure will be discussed in further detail.

Example Devices and Systems

FIG. 1 depicts a block diagram of an example computing system 100 for simulating application of a material (e.g., cosmetics) to a face according to example embodiments of the present disclosure. The system 100 can include a user computing device 102 and/or a server computing system 130 that for some implementations can be communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and memory 114. The one or more processors 112 can be, for example, any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the one or more processors 112 to cause the user computing device 102 to perform operations.

In some implementations, the user computing device 102 can store or access one or more AR simulation systems 120. For example, the AR simulation systems 120 can be or can otherwise include various scanners, augmented reality engines (e.g., ARKit, ARCore, etc.), multi-camera systems, or other similar systems that can generate a 3D representation based on one or more two-dimensional image inputs. While in general, systems can include multi-camera components or other features, implementations of the present disclosure are not limited to such advanced systems, and certain implementations may only include single camera systems that would be present on a smartphone or laptop computer. The 3D representations can provide mesh models or other similar models of surfaces defining external features of a person such as the face, or a region of the face. Alternatively or additionally, the AR simulation systems 120 can include or otherwise access image processing applications together including features that can be used to decompose an image into a plurality of datasets by filtering regions of the light spectrum. For instance, image processing applications can be applied to normalize intensity levels, in part by desaturating some or all of the pixels in an input frame. These applications can also include operations to adjust the levels in an image based on receiving an external input such as material properties data associated with a virtual cosmetic for a gamma level(s), an input black, and/or an input white, etc. The AR simulation systems 120 can further include instructions for blending the plurality of datasets, based at least in part on the detected location of the facial features, to generate an augmented image depicting the material applied to the facial feature.

In some implementations, the one or more AR simulation systems 120 can be received from the server computing system 130 over network 180, stored in the user computing device memory 114, and then used or otherwise implemented by the one or more processors 112. In some implementations, the user computing device 102 can implement multiple parallel instances of a single AR simulation system 120 (e.g., to perform image processing, AR mapping, and/or other similar applications in parallel.) These use cases may provide advantages for providing real-time simulations such a processing a video stream to simulate the application of lipstick on one or more faces shown in the video stream.

More particularly, the AR simulation system 120 can function to perform operations such as obtaining an image of a face and detecting a location of a facial feature of the face within the image. Aspects of AR simulation systems 120 can also include operations for decomposing the image into a plurality (e.g., 2, 3, or more than 3) image datasets respectively corresponding to a plurality of spectral bands and obtaining material property data descriptive of the AR material. For instance, the material property data can be associated with the material (e.g., cosmetic) and can further include data related to each of the spectral bands. Based at least in part on the detected location of the facial feature and in part on the material property data, example AR simulation systems 120 can generate or include operations for generating an augmented image that depicts the material applied to the facial feature of the face. Further the augmented image can be provided for display on the AR simulation systems 120 or a connected device.

For certain implementations, the AR simulation system 120 or other instructions 118 included as part of the memory 114 may be executed to store the augmented image as an avatar in a database or other local or external storage system for access at a later time. The stored avatar may be indexed based on aspects of the material property data, an input (e.g., a user input), and/or biometric features (e.g., using facial recognition if authorized or if a user has opted in to recognition indexing).

The server computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 may include or is otherwise implemented by one or more server computing devices. In instances in which the server computing system 130 includes plural server computing devices, such server computing devices can operate according to sequential computing architectures, parallel computing architectures, or some combination thereof.

As described above for the user computing device 102, the server computing system 130 can store or otherwise include one or more AR simulation systems 140. For example, the AR simulation systems 140 can be or can otherwise include various image processing engines including augmented reality engines and may also include scanning systems for generating 3D representations of surface features (e.g., a face or a region of a face such as the lips, cheeks, eyebrows, etc.).

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations the user computing device 102 can include a display for providing imagery such as augmented images to a user. Such implementations may include a simulation interface having access to the AR simulation system (e.g., through one or more associated APIs). The simulation interface can include a region for displaying the augmented image in real-time. Another region of the simulation interface can include adjustable elements for modifying the material properties data. In this manner, a user interacting with the simulation interface can adjust the augmented image in substantially real-time by selecting, for example, a different base color, opacity, gamma, reflectivity, etc.

As disclosed, the user computing device 102 and/or the server computing system 130 can include a number of applications (e.g., applications 1 through N). Each application can contain include an application programming interface (API) for accessing one or more operations performed by the application (e.g., image display, image processing, augmented reality engines, camera applications, file or data transmission, wireless communication or connection etc.) For example, in some implementations each application can communicate with one or more other components of the computing device, such as, for example, one or more sensors, a context manager, a device state component, and/or additional components. In certain implementations, each application can communicate with each device component using system API (e.g., a public API). In some implementations, the API used by each application is specific to that application.

Example Methods

Figure 2:
FIG. 2 depicts a flowchart diagram displaying an example method for simulating application of material to the skin according to example implementations of the present disclosure.

FIG. 2 depicts a flow chart diagram of an example method for simulating application of material to facial features according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system obtain an image of a face. The image can be included as part of an image sequence such as a video or a series of images that together provide a three-dimensional mapping of facial features. Alternatively, the image can include a single image frame comprising a plurality of pixels that together display a face. The single image frame and/or the pixels can be associated with depth or other coordinate information (e.g., as metadata) that may be used to generate a three-dimensional mapping of at least a portion of the image frame. Additionally, while the image is generally described as providing a face, it should be understood that other body parts or other objects may be present in the image including other faces.

At 204, the computing system can detect a location of a facial feature of the face within the image. Detecting the location of a facial feature may include utilizing a trained machine-learning model to determine first the location of the face in the image, the same or a different machine learning model can then determine the location of one or more features on the face (e.g., eyes, lips, noes, hair, etc.). For example, a machine learning model can be implemented as a classifier that can output a confidence metric for one or more pixels being associated with the facial feature. Alternatively or additionally, a computer vision machine learning model configured to generate a bounding box defining a region of the face that includes at least the facial feature can be used. Similar models for recognition identifying features or locations associated with different facial features may also be used including models or other applications present on commercially available technologies (e.g., smartphones.)

At 206, the computing system can decompose the image into a plurality of image datasets respectively corresponding to a plurality of spectral bands. Example aspects of decomposing an image into multiple image datasets can include: adjusting the levels in the image. Adjusting the levels in the image can include changing the input black (e.g., the darkest pixel of the image) and the input white (e.g., the lightest pixel of the image) brightness range to a normalized range. The normalized range can also be changed to generate an output black and an output white that can be independent from the input black and the input white of the original image. Further aspects of decomposing the image can include adjusting the gamma value(s) for some or a portion of the original image. Techniques for decomposing the image can include light spectrum decomposition based on pixel values across the entire image or pixel values within certain neighborhoods of the image.

In general, implementations of the disclosure can utilize a variety of applications for performing image processing. Advantages of example implementations according to the present disclosure include the ability to implement image processing using applications (e.g., by accessing operations through an API) present on a variety of devices including personal computers and smart phones. Thus, image processing can be implemented at the device level such that in some implementations a remote connection need not be necessary. Alternatively, image processing may take place on a remote device or server which may improve the speed of image processing for providing augmented image data in substantially real-time.

At 208, the computing system can obtain material property data associated with the material, the material property data comprising data for each of the plurality of spectral bands. Aspects of the material property data can include attributes such as color, opacity, and/or reflectivity. Additionally, some or all of the material property data may be associated with the plurality of spectral bands such that decomposing the images into a plurality of spectral bands includes adjusting the levels in the image based at least in part on one attributed included in the material property data.

At 210, the computing system can generate, based at least in part on the detected location of the facial feature and further based at least in part on the material property data, an augmented image that depicts the material applied to the facial feature of the face. Aspects of generating the augmented image can include one or more blending operations for combining the decomposed image datasets with material properties data and/or material maps generated using the material properties data. For instance, generally, an alpha blend with the original input frame/image is performed during the generation of the augmented image. Additional blending operations can be performed to combine data from the image datasets associated with the spectral bands, other material property data, and/or AR maps of the facial feature.

For certain implementations, each of these blending operations can be weighted and may be performed in a certain order or combined into a single operation. For example, the mid-tones map may be blended with one or more image datasets associated with a light spectrum range. In an example process for generating the augmented image, the mid-tones map can be blended with the image datasets associated with the shadows and mid-tones ranges to generate a screen blend. Then the screen blend can be blended with the image dataset associated with the highlights range and the highlights map to generate an add blend. The add blend can be blended with the original image, or the original image and a shadows map, to produce the augmented image. Further, these blending operations can include additional input(s) to incorporate material property data such as mid-tones opacity, highlights opacity, or lipstick opacity (referenced in images as lip opacity). Additional aspects of blending operations may be better understood with reference to the example arrangement shown in FIG. 3.

At 212, the computing system can provide, for display on a device, the augmented image. For instance, a video connection or stream using a camera in communication with the device may be provided to display the augmented image in substantially real-time, even as a person in the video frame moves his or her face and/or the facial feature. Implementations according to the disclosure can provide an augmented image as a sequence of image frames such as a video or a virtual model, the virtual model including one or more image slices that together can provide a three-dimensional representation (e.g., using an AR engine). Alternatively, certain implementations may provide an augmented image as a single image frame that only provides a two-dimensional representation of the face including the virtual cosmetic.

Example Arrangements

Figure 3:
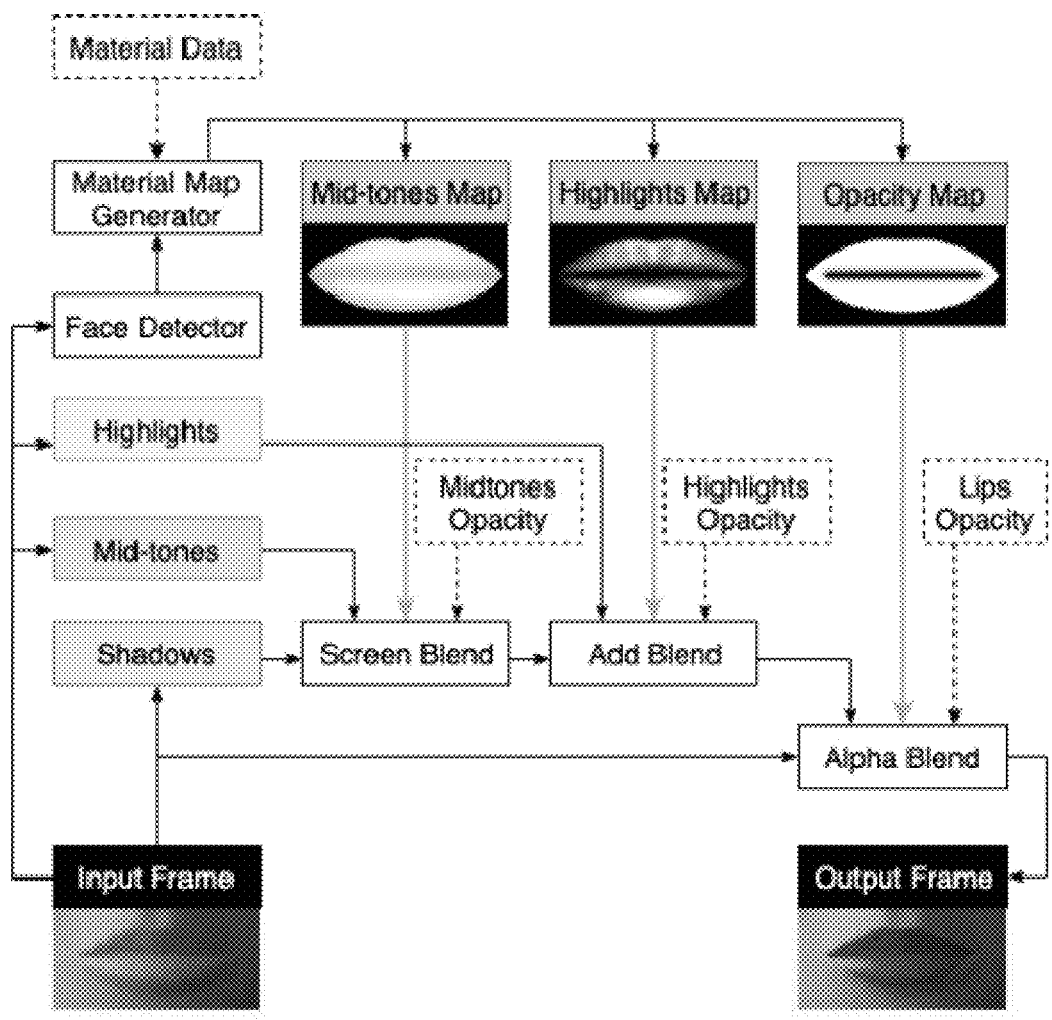
FIG. 3 depicts a process flow diagram displaying an example implementation according to the present disclosure.

FIG. 3 displays an example arrangement for simulating the application of makeup using AR techniques. As shown, FIG. 3 depicts an example process where an input frame including data for providing an image of a face can be decomposed into a plurality (e.g., 2, 3, or more than 3) image datasets related to spectral bands (e.g., regions of the light spectrum, regions of the light intensity/brightness spectrum, etc.) shown here as highlights, mid-tones, and shadows. Decomposing the input frame can include various image processing operations such as adjusting the saturation of the input frame, adjusting image levels for the input frame such as an input black and input white value, and/or other similar operations.

The input frame may include some or a portion of the face, as well as other imagery. Using a face detector or other application configured to detect a face and/or identify different regions of the face. A material map can be generated for at least the region of the face, based in part on material property data associated with the virtual cosmetic (e.g., color, opacity, reflectivity, etc.) Additionally, the material property data can be associated with data for each of the spectral bands, which can be combined with the region identified by the face detector to create material maps which may also be referred to as proto-images. The proto images can be combined with the image data sets using various blending operations that can be performed in a sequence of steps as shown in the figure, or that can be combined into a single blending operation. In general, an alpha blend, in which the input frame is blended with one or more other blends is performed to generate the augmented image depicting the material (e.g., lipstick) applied to the facial feature (e.g., lips) of the face.

Aspects of the material property data can be used to transform texture corresponding to different parts of the light spectrum. Additionally, material data property can be used to provide opacity values when the transformed light spectrum textures are blended together according to FIGS. 3, 4A, 4B, 5A and 5B.

Aspects of implementations according to the present disclosure can include image processing techniques as illustrated by the example process flow diagrams depicted in FIGS. 4A, 4B, 5A, and 5B. Each of these figures depicts one or more steps for processing an input frame by adjusting image properties. For some steps, an operation is performed such as desaturation that can be independent from the material properties associated with the virtual cosmetic. Alternatively, at certain steps, an image attribute is adjusted, based in part on material property data. In each of figures, material property data is indicated by a dashed box and/or arrow. Thus, at these steps the image attribute is adjusted based on a material property such as a base color, input black, input white, gamma, gray color, etc.

Figure 4A:
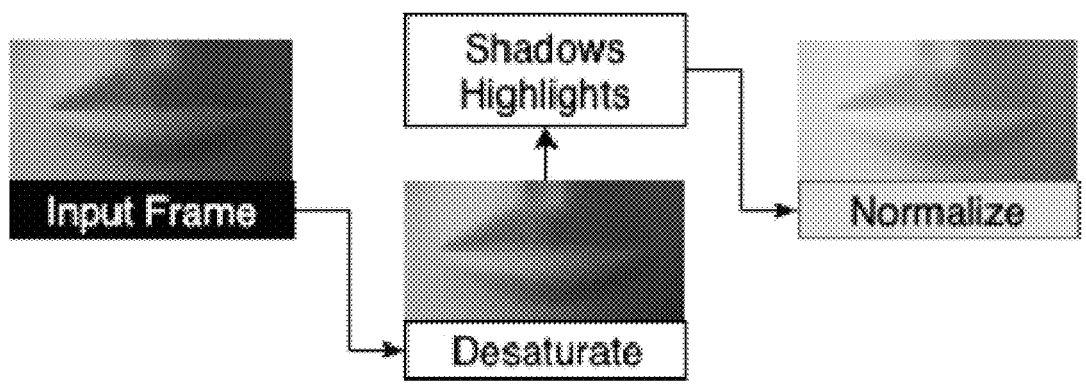
FIGS. 4A and 4B depict process flow diagrams showing example aspects of implementations according to the present disclosure.
Figure 4B:
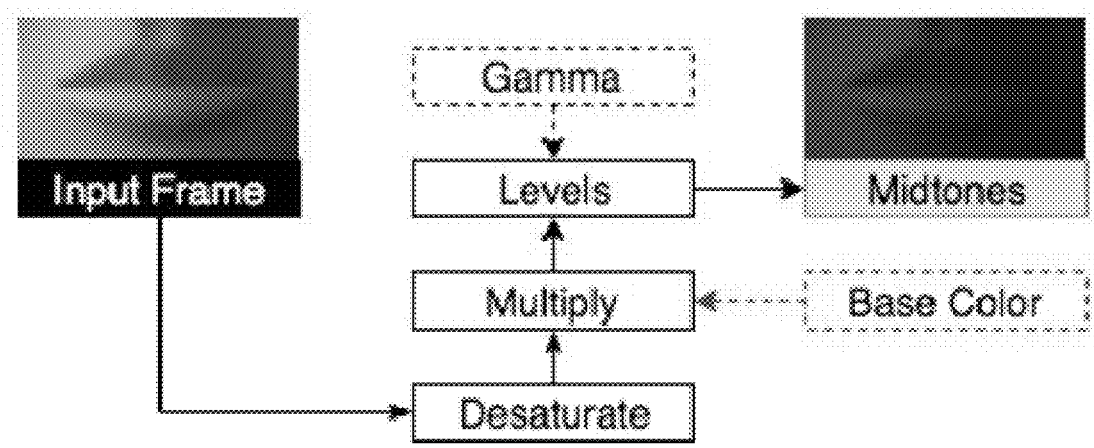
Figure 5A:
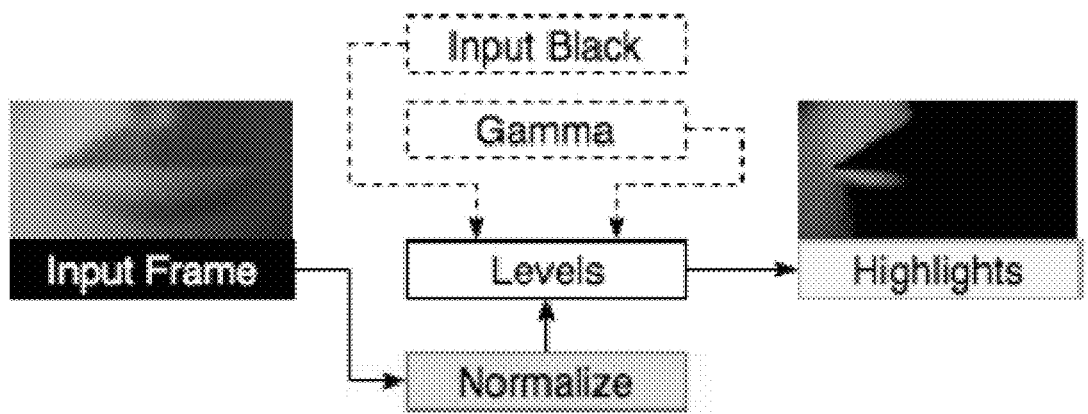
FIGS. 5A and 5B depict process flow diagrams showing further example aspects of implementations according to the present disclosure.
Figure 5B:
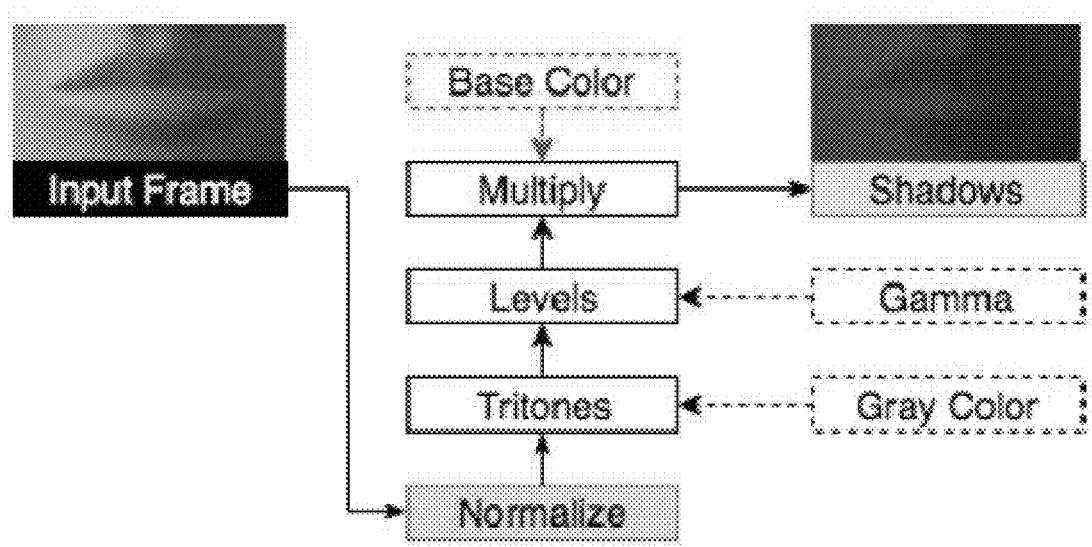

For instance, FIGS. 4A and 4B depict example image processing techniques that can be used to decompose the image or input frame into one or more spectral datasets. FIG. 4A illustrates an aspect of some decomposition techniques for normalizing the intensity of an image frame. Image normalization can provide benefits for enhancing the quality of augmented images by reducing the effect of different skin-tones and/or lighting conditions on the augmented image. For some implementations, image normalization can be incorporated in filtering highlights as shown in FIG. 5A and/or shadows as shown in FIG. 5B. However, each of these figures are provided to demonstrate example techniques and implementations of the disclosure need not be limited to such example processes.

As an example for illustration, image normalization is shown to include desaturating the input frame. FIG. 4B displays an example technique for extracting a mid-tones spectral band from an image frame and applying further transformation based on material property data. Thus, aspects of example image processing techniques can include adjusting the saturation of an input frame to reduce the saturation. Further complete desaturation need not be effected, and so desaturation should be understood to indicate reducing the saturation levels of some or a portion of the input frame.

With reference to example decomposition techniques, FIG. 4B illustrates an example process for extracting a mid-tones spectral band from an image frame and applying further transformation based on material property data. The input frame can be desaturated using a photo editing application and the resulting image multiplied by a base color value (e.g., an RGB pixel value) that may be limited to only a region of the input frame. Image levels, which can include brightness levels defining aspects such as a histogram of brightness from complete black to complete white, can be adjusted based in part on a gamma value associated with the material to produce the mid-tones image dataset.

FIG. 5A illustrates an example process for extracting a highlights spectral band from an image frame and applying further transformation based on material property data. The input frame can be normalized using an example technique (e.g., as depicted in FIG. 4A). The levels of the normalized image can then be adjusted based in part on an input black and a gamma value associated with the material to produce the highlights image dataset. FIG. 5B illustrates an example process for extracting a shadows spectral band from an image frame and applying further transformation based on material property data. The input frame can be normalized using an example technique (e.g., as depicted in FIG. 4A). The tritones of the normalized image can be adjusted based in part on an input gray color associated with the material and the levels of the image adjusted based in part on an input gamma associated with the material. The resulting image data can be combined with a base color based on a multiplier or other weighting that can be limited to only a region of the input frame to produce an example shadows image dataset.

Example Augmented Images

Figure 6A:
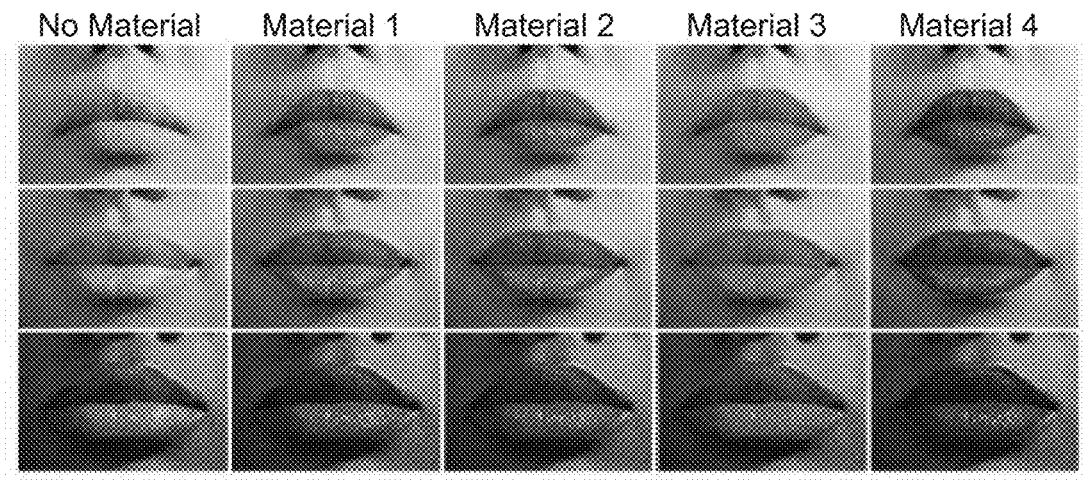
FIGS. 6A and 6B depict augmented images produced according to example implementations according to the disclosure.
Figure 6B:
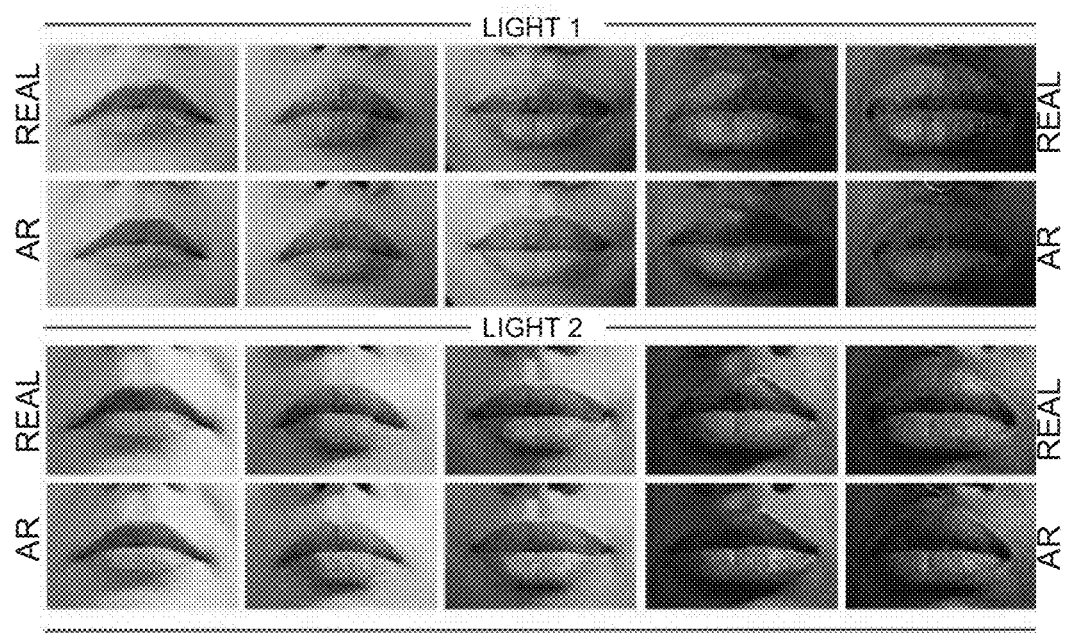

FIGS. 6A and 6B display example augmented images produced using example techniques according to the present disclosure. In FIG. 6A, an input image (e.g., an image having no virtual material) is shown (left) in comparison to augmented images associated with different material properties (materials 1-4). As shown, the augmented images display aspects of quality such as localization of the augmented feature with little or no detectable alteration to other portions of the face. Additionally, the augmented images can be generated for various skin tones and retain similar visual properties such as color, opacity, and reflectivity. In FIG. 6B, real images of faces that have lipstick applied to the face (REAL) are displayed above augmented images (AR) displaying a virtual material with material properties designed based on the real lipstick. FIG. 6B further displays that augmented images can be generated under different lighting conditions using different people having differently shaped lips. Thus, generally the example augmented images demonstrate that implementations according to the disclosure are robust and can be applied in various use cases.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for simulating application of materials to facial features, the method comprising:
   obtaining, by one or more computing devices, an image of a face;
   detecting, by the one or more computing devices, a location of a facial feature of the face within the image;
   decomposing, by the one or more computing devices, the image into a plurality of image datasets respectively corresponding to a plurality of spectral bands;
   obtaining, by the one or more computing devices, material property data associated with a material, wherein the material property data comprises data for each of the plurality of spectral bands, wherein the plurality of spectral bands comprise: a shadows band, a highlights band, and a mid-tones band;
   processing, by the one or more computing devices, each image dataset for each of the plurality of spectral bands with the material property data to generate a plurality of merged datasets, wherein processing each image dataset for each of the plurality of spectral bands with the material property data to generate the plurality of merged datasets comprises:
     generating, by the one or more computing devices, a screen blend based on a shadows image dataset associated with the shadows band, a mid-tones image dataset associated with mid-tones band, and a mid-tones map of the material property data;
     generating, by the one or more computing devices, an add blend based on a highlights image dataset associated with the highlights band, the screen blend, and a highlights map of the material property data; and
   generating, by the one or more computing devices, and based at least in part on the detected location of the facial feature and further based at least in part on the material property data and the plurality of merged datasets, an augmented image that depicts the material applied to the facial feature of the face.

2. The method of claim 1, wherein the material comprises a virtual lipstick and the facial feature comprises lips.

3. The method of claim 1, wherein the material property data describes a level of reflectivity of the material.

4. The method of claim 1, wherein generating, by the one or more computing devices, the augmented image comprises:
   adjusting, by the one or more computing devices, at least one image dataset corresponding to at least one of the plurality of spectral bands with the material property data for the same spectral band to generate one or more proto-images, wherein the material property data comprises the mid-tones map fora mid-tones range and a shadows range, the highlights map fora highlights range, and an opacity map for blending; and
   alpha blending, by the one or more computing devices, at least one of the one or more proto-images with the opacity map of the facial feature.

5. The method of claim 1, wherein detecting, by the one or more computing devices, the location of the facial feature of the face within the image comprises performing, by the one or more computing devices, semantic segmentation on the image using a machine-learned segmentation model to obtain a segmentation mask that identifies the location of the facial feature within the image.

6. The method of claim 1, wherein detecting, by the one or more computing devices, the location of the facial feature of the face within the image comprises generating, by the one or more computing devices, a three-dimensional facial feature surface from the image;

the material property data comprises a material property map; and generating, by the one or more computing devices, and based at least in part on the detected location of the facial feature and further based at least in part on the material property data, the augmented image that depicts the material applied to the facial feature of the face comprises warping, by the one or more computing devices, the material property map on top of the three-dimensional facial feature surface.

7. The method of claim 1, wherein decomposing, by the one or more computing devices, the image into a plurality of image datasets respectively corresponding to a plurality of spectral bands comprises one or more of: adjusting an input black and an input white value range defined by the image to a normalized range, performing gamma correction on the image, or adjusting the normalized range to an output black and an output white.

8. The method of claim 7, wherein decomposing, by the one or more computing devices, the image further comprises a normalization step comprising:

generating, by the one or more computing devices, a desaturated image by reducing the saturation of the image dataset, and processing, by the one or more computing devices, the desaturated image by filtering one or more light spectrum ranges, wherein the normalization process is performed prior to adjusting the input black and the input white value range defined by the image to the normalized range, performing gamma correction on the image, or adjusting the normalized range to the output black and the output white.

9. The method of claim 1, further comprising:

performing, by the one or more computing devices and in real-time, the method of claim 1 for each of a plurality of sequential image frames;

wherein, for each of the plurality of sequential image frames: detecting, by the one or more computing devices, the location of the facial feature of the face within the image comprises performing, by the one or more computing devices, a face tracking technique to track the location of the facial feature over the plurality of sequential image frames.

10. A computing system configured to simulate application of a material to skin of a face, the computing system comprising:

one or more processors; and one or more non-transitory computer-readable media that collectively store instructions that, when executed by the one or more processors cause the computing system to perform operations, the operations comprising:

obtaining an image of the face;

detecting a location of a facial feature of the face within the image;

decomposing the image into a plurality of image datasets respectively corresponding to a plurality of spectral bands;

obtaining material property data associated with the material, wherein the material property data comprises data for each of the plurality of spectral bands, wherein the plurality of spectral bands comprise: a shadows band, a highlights band, and a mid-tones band;

processing each image dataset for each of the plurality of spectral bands with the material property data to generate a plurality of merged datasets, wherein processing each image dataset for each of the plurality of spectral bands with the material property data to generate the plurality of merged datasets comprises:

generating a screen blend based on a shadows image dataset associated with the shadows band, a mid-tones image dataset associated with mid-tones band, and a mid-tones map of the material property data;

generating an add blend based on a highlights image dataset associated with the highlights band, the screen blend, and a highlights map of the material property data; and generating, based at least in part on the detected location of the facial feature and further based at least in part on the material property data and the plurality of merged datasets, an augmented image that depicts the material applied to the facial feature of the face.

11. The computing system of claim 10, wherein the computing system further comprises a camera and a display, and wherein obtaining the image of the face comprises:

accessing the camera included with the computing system to obtain a photo or a video depicting the face.

12. The computing system of claim 10, wherein, to perform one or more of the operations, the computing system accesses one or more applications included the computing system or a function performed by the one or more applications via use of an application programming interface associated with the one or more applications.

13. The computing system of claim 12, wherein the one or more applications comprise a graphics editor for performing a decomposition technique.

14. The computing system of claim 13, wherein the decomposition technique comprises one or more of: adjusting an input black and an input white value range defined by the image to a normalized range, performing gamma correction on the image, or adjusting the normalized range to an output black and an output white.

15. The computing system of claim 14, wherein decomposing further comprises a normalization process comprising:

generating, by the graphics editor, a desaturated image by reducing the saturation of the image dataset, and processing, by the graphics editor, the desaturated image by filtering one or more light spectrum ranges, wherein the normalization process is performed prior to adjusting the input black and the input white value range defined by the image to the normalized range, performing gamma correction on the image, or adjusting the normalized range to the output black and the output white.

16. The computing system of claim 10, wherein generating the augmented image occurs substantially in real-time.

17. The computing system of claim 16, wherein the operations further comprise:

providing, for display in real-time, the augmented image on the screen.

18. The computing system of claim 10,
wherein the material property data comprises the mid-tones map for blending with the mid-tones band and the shadows band, the highlights map for blending with the highlights band, and an opacity map; and
wherein the augmented image is generated based at least in part on the opacity map and the plurality of merged datasets.

19. One or more non-transitory computer-readable media that store instructions that, when executed by one or more processors, cause the one or more processors to perform operations, the operations comprising:
obtaining an image of a face;
detecting a location of a facial feature of the face within the image;
decomposing the image into a plurality of image datasets respectively corresponding to a plurality of spectral bands;
obtaining material property data associated with a material, wherein the material property data comprises data for each of the plurality of spectral bands, wherein the plurality of spectral bands comprise: a shadows band, a highlights band, and a mid-tones band;
processing each image dataset for each of the plurality of spectral bands with the material property data to generate a plurality of merged datasets, wherein processing each image dataset for each of the plurality of spectral bands with the material property data to generate the plurality of merged datasets comprises:
generating a screen blend based on a shadows image dataset associated with the shadows band, a mid-tones image dataset associated with mid-tones band, and a mid-tones map of the material property data;
generating an add blend based on a highlights image dataset associated with the highlights band, the screen blend, and a highlights map of the material property data; and
generating, based at least in part on the detected location of the facial feature and further based at least in part on the material property data and the plurality of merged datasets, an augmented image that depicts the material applied to the facial feature of the face.

* * * * *